United States Patent [19]

Bonne et al.

[11] Patent Number: 4,900,448

[45] Date of Patent: Feb. 13, 1990

[54] MEMBRANE DEHUMIDIFICATION

[75] Inventors: Ulrich Bonne, Hopkins, Minn.; David W. Deetz, Wexford, Pa.; Juey H. Lai, Burnsville, Minn.; David J. Odde, Minneapolis, Minn.; J. David Zook, Burnsville, Minn.

[73] Assignee: Honeywell Inc., Minneapolis, Minn.

[21] Appl. No.: 289,467

[22] Filed: Dec. 21, 1988

Related U.S. Application Data

[62] Division of Ser. No. 174,920, Mar. 29, 1988.

[51] Int. Cl.$^4$ .............................................. B01D 13/01
[52] U.S. Cl. ..................................... 210/637; 55/16; 55/158; 210/651; 210/321.8; 210/321.89; 210/500.23

[58] Field of Search .................... 55/16, 158; 210/634, 210/637, 640, 644, 649, 650, 651, 500.23, 500.1, 500.21, 321.6, 321.72, 321.78, 321.79, 321.8, 321.87, 321.88, 321.89

[56] References Cited

U.S. PATENT DOCUMENTS 4,583,996  4/1986  Sakata et al. ............................ 55/16

Primary Examiner—Frank Sever
Attorney, Agent, or Firm—Omund R. Dahle

[57] ABSTRACT

The instant invention provides a method and system for dehumidifying air by microphorous organic hollow fibers having a hygroscopic liquid disposed in the pores thereof for providing a concentration gradient sufficient to provide a continuous water removal mechanism.

7 Claims, 4 Drawing Sheets

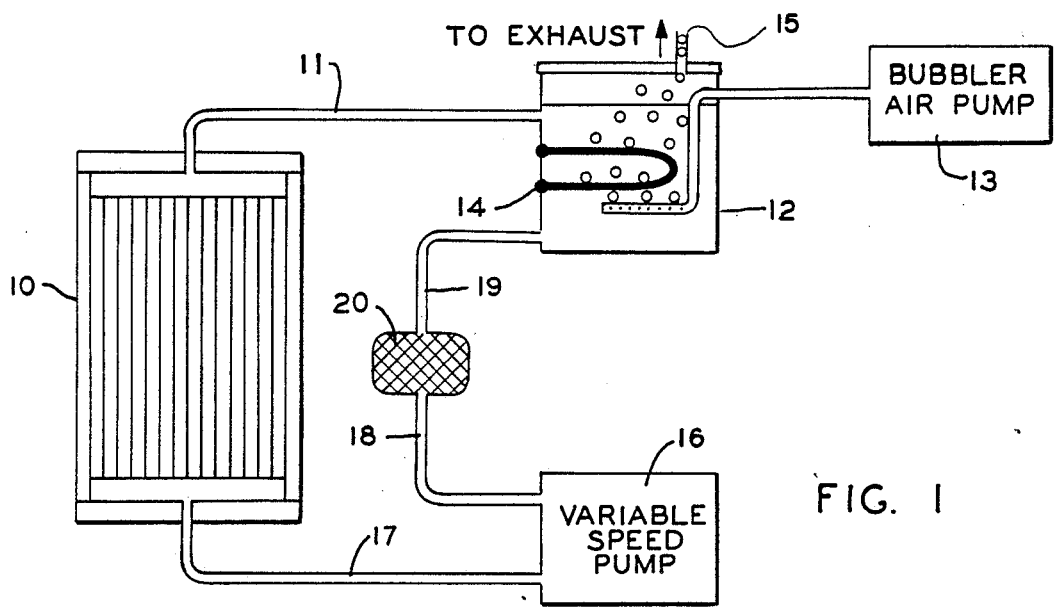
FIG. 1
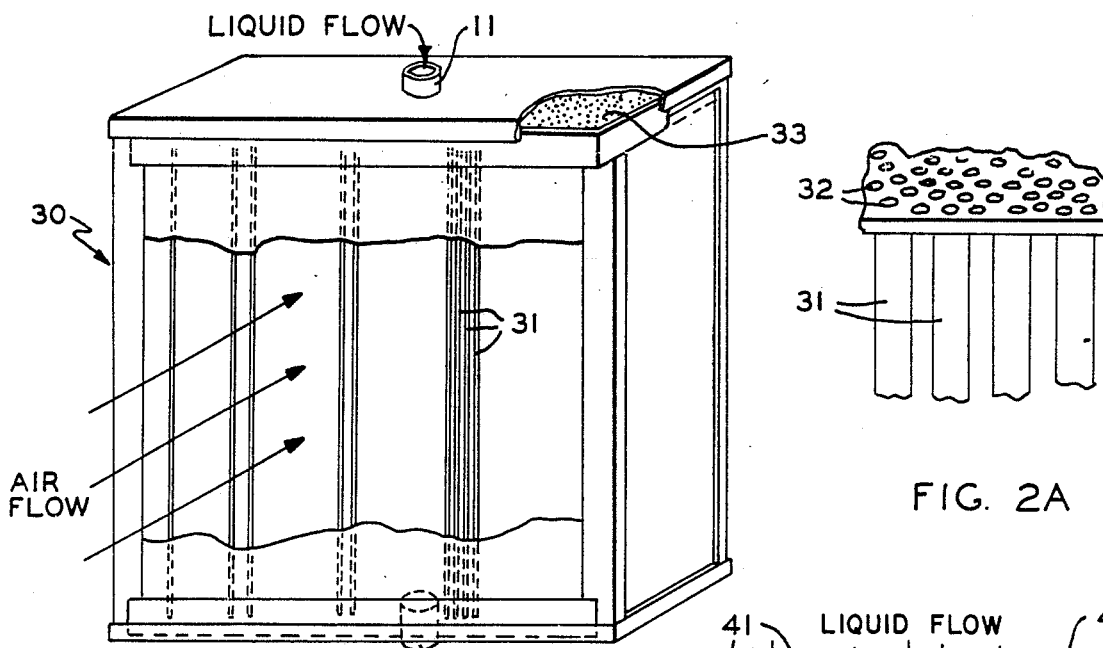
FIG. 2
FIG. 2A
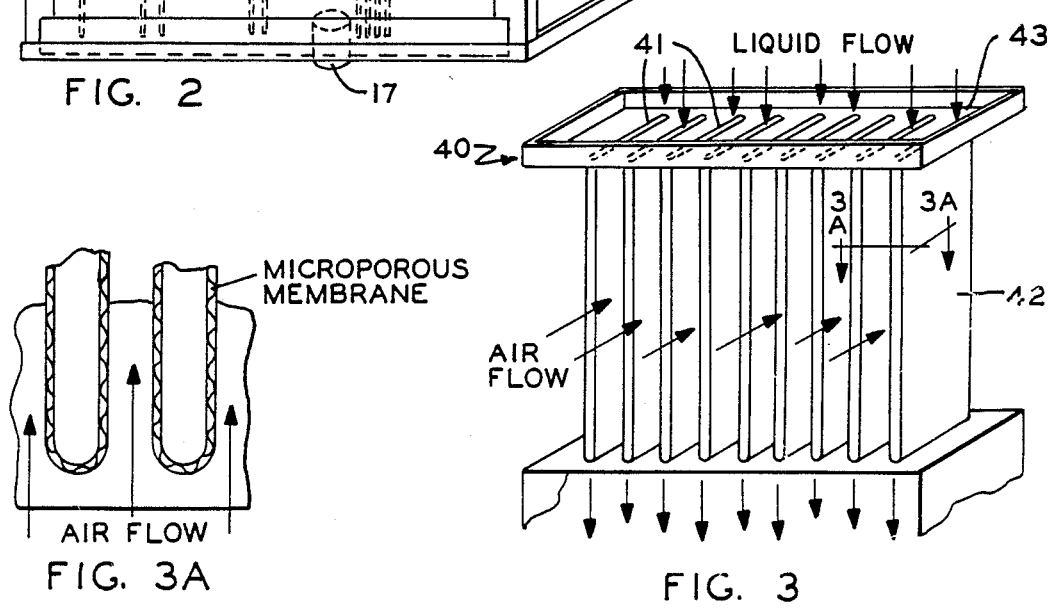
FIG. 3A
FIG. 3

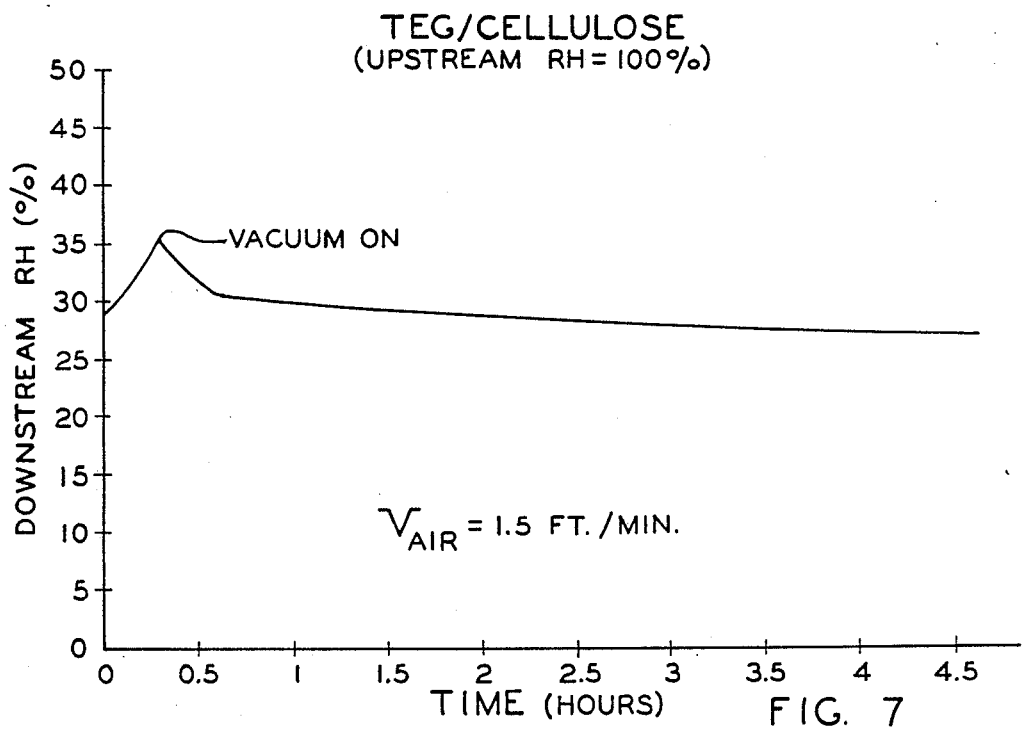
FIG. 7
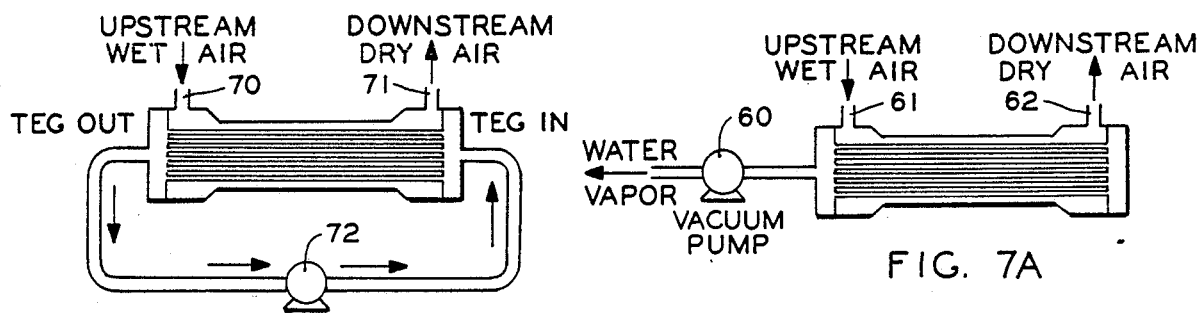
FIG. 8A
FIG. 7A
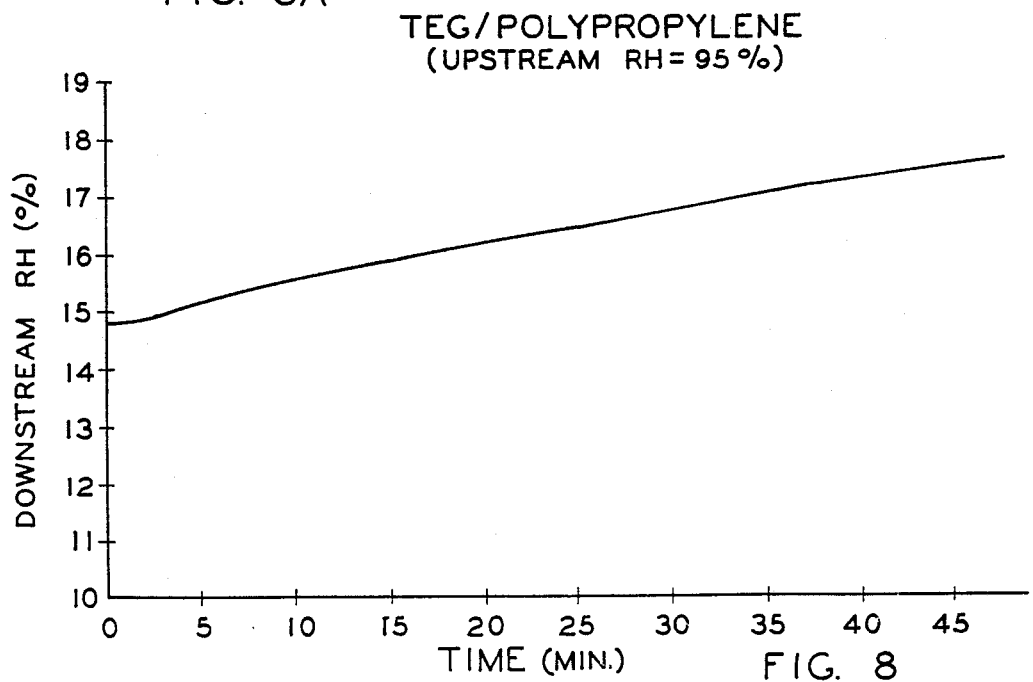
FIG. 8

MEMBRANE DEHUMIDIFICATION

This application is a division, of application Ser. No. 07/174,920, filed Mar. 29, 1988 pending.

BACKGROUND OF THE INVENTION

1. Field of the Invention

The present invention relates generally to the separation of gaseous or vapor phase species by means of immobilized liquid membrane (ILM) materials. More particularly, the invention concerns the removal of water vapor from the ambient atmosphere of a conditioned space.

2. Background Art

Numerous approaches to the separation of one gas from a mixture of gases by preferential differential permeation have been investigated over the years. Membrane systems for the separation of gases are potentially attractive because they offer low capital and operating costs, along with low energy consumption requirements. Stabilized immobilized liquid membranes (ILM's) which achieve the simultaneously high permeability and selectivity associated with earlier ILM's together with an extremely high flux in a manner which overcomes the time variable stability problems associated with early ILM's are described in U.S. Pat. No. 4,710,205 assigned to the same assignee as the present invention. That application also describes in detail how the Kelvin effect operates to increase the stability of immobilized liquid membranes with reference to the lowered vapor pressure of the liquid contained in the membrane pores. To the extent that material from that application is required to supply any additional information relevant to the understanding of material in this application, it is hereby incorporated by reference.

The detrimental effect of high relative humidity with respect to the environment of a controlled space, is well known both as to its effects regarding the comfort of the occupants and with respect to items which need to be stored at lower relative humidity to prevent damage from phenomena associated with prolonged high humidity exposure. For these and many other reasons, humidity control has become a necessity for a wide variety of types of conditioned spaces.

Prior to the utilization of membrane-type separation techniques, the most widely practiced method of removing water vapor from a conditioned space involved condensing moisture contained in the atmosphere by cooling the atmosphere below the dew point. This method works very well with respect to the reduction of high humidities to reasonable humidity readings, however, it does require large quantities of energy to be expended to achieve condensation of the moisture.

Other methods include the use of hygroscopic agents or salts to remove moisture from the atmosphere. This technique has been most often associated with the removal of additional water vapor at lower humidities to achieve a relatively dry state. The salts, of course, must also be regenerated or discarded after absorbing quantities of water.

Still there remains a need, however, for a practical, stable, continuously operable system for the removal of condensable gas, especially water vapor, which combines long life with low energy consumption.

SUMMARY OF THE INVENTION

The present invention provides a method and apparatus for separating a condensable gas, especially water vapor, in a stable, low cost efficient manner. With respect to the vapor removal method and apparatus of the present invention, in the preferred arrangements the porous membranes considered are those made of hollow fibers containing radial pores in addition to the hollow central axial capillary.

In one embodiment, a hygroscopic collecting liquid is stabilized in the pores of the hollow fibers. When the humid air is addressed and caused to flow past and perpendicular or parallel to the axis of the hollow fibers and external thereto, the water vapor is sorbed by the liquid. The water vapors diffuse across the liquid (due to concentration gradient) and are desorbed in a vacuum which is maintained on the internal axial capillary passages of the hollow fibers, i.e., the hollow side of the fibers. The fibers are normally arranged in parallel bundles much in the manner of the tubes in a shell and tube heat exchanger. For the system of this configuration to be effective, the liquid must have a low vapor pressure so that an adequate vacuum can be maintained to remove the sorbed water or other condensable gas sought to be removed.

In an alternate embodiment, hygroscopic collecting liquid is flowed inside the hollow fibers not wetting the pores, i.e., the pores are gas filled. Upon exposure to humid air, water vapors in the air diffuse through the pores and are absorbed by the liquid and carried away. This system requires regeneration of the hygroscopic liquid to remove the water vapor prior to reuse.

A third embodiment involves the use of a hygroscopic porous membrane system with extremely small pore size ($\leq 0.003$ microns) to remove the water vapor. The removal in this embodiment is based on the Kelvin effect or "super" Kelvin effect in which a tremendous reduction of the vapor pressure of the liquid, e.g., water in the pores occurs in hydrophilic membranes having extremely small pores. In this embodiment, water molecules continually condense in the pores of the membrane and are removed continuously by a vacuum introduced on the other side of the membrane. The water in the humid ambient air replenishes the supply in the pores. This enables continuous operation of the system without interruption or loss of vacuum. In this system, the only requirement is that the partial pressure of the water vapor in the ambient atmosphere be higher than the vapor pressure of the water condensing in the pores in order for removal to occur.

With respect to the collecting liquids, preferred liquids include polyethylene glycol (PEG), triethylene glycol, other polar glycols, alcohols or glycerols, or a solvent/solute liquid system which may be an aqueous electrolyte solution such as, for example, a solution of alkali metal salt or other such hygroscopic systems. These include such species as LiBr, $Li_2CO_3$, etc. It will be further appreciated that other species of collecting liquids which would be useful in the present invention might occur to these skilled in the art.

Embodiments described with respect to exposing one side of the porous material to a vacuum may, in many cases, employ a sweep stream of gas of low relative humidity to remove the condensed water vapor rather than employing a vacuum. Water vapor will be continuously removed as long as the partial pressure of the water vapor in the vacuum or sweep gas is lower than the vapor pressure of the water in the condensed liquid. Of course, the greater the differential, the more efficient the removal.

BRIEF DESCRIPTION OF THE DRAWINGS

In the drawings:

FIG. 1 is a schematic diagram of a water vapor removal system in accordance with one embodiment of the invention;

FIG. 2 is an enlarged perspective detail, with parts cut away, of a hollow fiber membrane filter water vapor removal module in accordance with the invention;

FIG. 2A is a further enlarged fragmentary detail of the hollow fiber bundle of the device of FIG. 2;

FIG. 3 illustrates an alternate stretched fabric membrane configuration of the membrane filter water vapor removal module of FIG. 2;

FIG. 3A is an enlarged detail of the stretched fabric micro porous membrane construction of FIG. 3;

FIGS. 7 and 7A respectively represent a time plot of the relative humidity (RH) of downstream air and a system schematic with respect to the technique of FIG. 4.

FIGS. 8 and 8A respectively represent a time plot of the relative humidity (RH) of downstream air and a system schematic with respect to the technique of FIG. 5.

DETAILED DESCRIPTION

Figure 4:
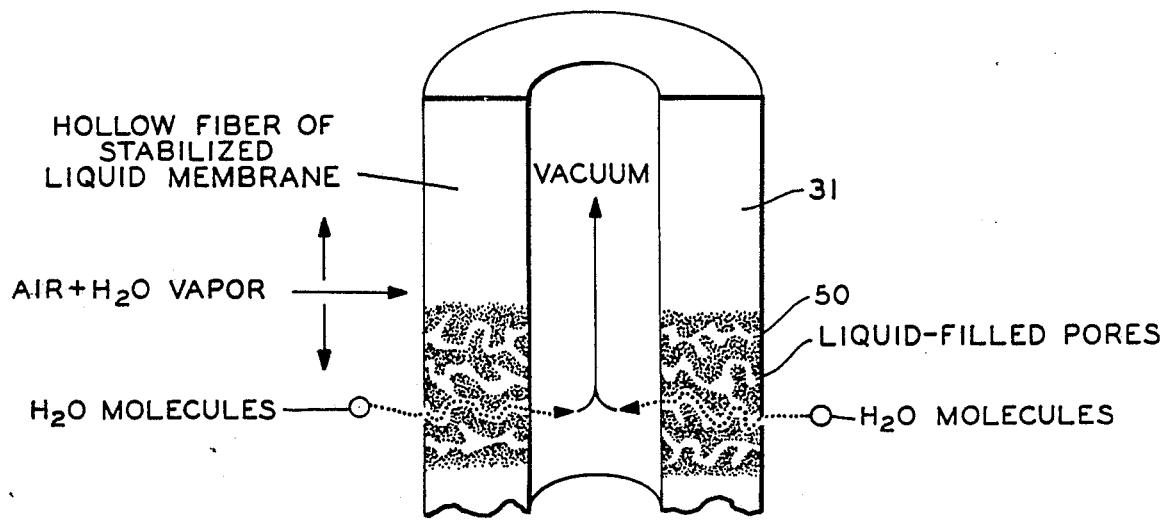
FIGS. 4–6 represent greatly magnified fragmentary sectional views of hollow fiber membranes illustrating three alternate removal techniques.

The invention contemplates a method and system for the efficient selective transfer or removal of a condensable vapor of interest from the ambient atmosphere of a conditioned space. The illustrated species of interest is water vapor. The system may take any one of several forms, each utilizing one or more advantages associated with transfer through the walls of microporous hollow fibers or across microporous membrane materials in conjunction with pressure and/or concentration gradient differentials.

One system is depicted schematically in FIG. 1. That system includes a membrane water vapor removal filter module 10, which contains the bundle of hollow fibers or other membrane exchange medium configuration such as a plate and frame system having sections of thin membrane fabric stretched over frames. The water vapor removal module is connected, as by a supply conduit 11, to a source of collecting liquid as a reservoir 12. The collecting fluid may be regenerated to remove absorbed water vapor as through the use of an air bubbler 13, in conjunction with heating element 14. The species of interest (water vapor) is exhausted through external means as by exhaust duct 15. The collecting fluid is circulated, as by means of a variable speed fluid pump 16, which may be a paristaltic pump, through a closed loop system also including conduits 17, 18, and 19, along with fluid filter 20.

It will be appreciated that the collecting fluid may be a one-component medium such as a hygroscopic oil having a high boiling point and one which is compatible with the material of the membrane filters such as cellulose fibers or a polyolefin film or other membrane material. Preferred oil-type liquids include polyethylene glycol (PEG), triethylene glycol, or mixtures thereof. It also is possible to employ various other glycols, alcohols, glycerols, etc. in which the hydroxyl group acts sufficiently as a polar group to make the compound sufficiently hygroscopic. The collecting fluid may also be a solvent/solute liquid system which may be an aqueous electrolyte solution such as, for example, a concentrated aqueous solution of an alkali metal salt or other such hygroscopic systems. Examples of these include such species as LiBr, $Li_2CO_3$, etc. As long as the solvent and dissolved solute species are compatible with the other materials of the system, and the solution will function in the desired humidity range for the conditioned space, it will work successfully FIGS. 2 and 3 together with respective enlarged detailed fragments 2A, and 3A, depict alternate embodiments 30 and 40, of a membrane filter module as at 10. In FIGS. 2 and 2A, a large number of hollow tubular membrane fibers 31, which may be cellulose, or the like, are disposed in parallel spaced relation much in the fashion of the tube bundle in a shell and tube heat exchanger. In FIG. 3, the configuration is more in the nature of a parallel plate system in which, basically narrow, hollow, rectangular passages are provided having generally hollow interiors as at 41 and sidewalls defined by a membrane of stretched fabric in substantially sheet form as at 42. The membrane covered passages are shown in greater detailed in the fragmentary top view of FIG. 3A.

Normally, the ambient atmosphere containing the water vapor or other species of interest to be removed, or partially removed, is caused to contact the membrane on the outside of the tubes of the tube bundle of FIG. 2 or the parallel plates of FIG. 3, generally perpendicular to and between the fibers or plates to maximize contact area. A closed system in which the atmosphere is caused to flow parallel or counter to the plates or fibers, however, is also possible. This type was used experimentally as it facilitated the taking of data. Flow is normally controlled by a conventional fan or blower (not shown).

In the system of FIG. 1, a hygroscopic liquid having a high boiling point which and is chemically compatible with the material of the fibers or membrane covering is caused to flow vertically from top to bottom inside the hollow individual fibers of the fiber bundle from a supply reservoir 33, (FIG. 2) or from a reservoir 43 through the interior of the openings 41, in FIG. 3.

It will be appreciated with respect to the use of the hollow fiber bundle that this presents a very large sorption area per unit volume for the water vapor or other species to be sorbed through the pores in the fibers. This allows the actual exchange module to be relatively quite compact.

EXAMPLE 1

The method of Example 1 is illustrated in the enlarged fragmentary view of the fiber 31 found in FIG. 4. In this example the composition of the fiber material and the collecting liquid are selected such that the collecting liquid wets the pores of the fibers or membrane used. The combination of microporous cellulose fibers with triethylene glycol oil was used in this Example 1. The pores 50 became filled or partially filled with the hydrophilic oil which directly sorbed $H_2O$ vapor molecules from the humid inlet air. In the example a membrane module consisting of 10,800 hollow fibers contained in a plastic jacket was used to make up a counter flow system as shown in FIG. 7A. The hollow fibers were made of cellulose with an average pore size of 0.003 microns. Triethylene glycol (TEG) was stabilized in the pores of the fibers. TEG is one of the few hygroscopic oils which is non-toxic, high-boiling and compatible with cellulose membrane. A vacuum pump as at 60, in FIG. 7A was utilized to maintain a partial vacuum inside the fibers while the air was circulated through a closed system in counter current fashion.

It is seen from FIG. 7 that the humidity in the upstream air is reduced from 100% to 29% upon the one pass through the module. But the humidity on the downstream side increased slowing with time until the vacuum was applied. After the vacuum was applied the downstream humidity was again maintained at a steady 28%.

EXAMPLE 2

Figure 5:
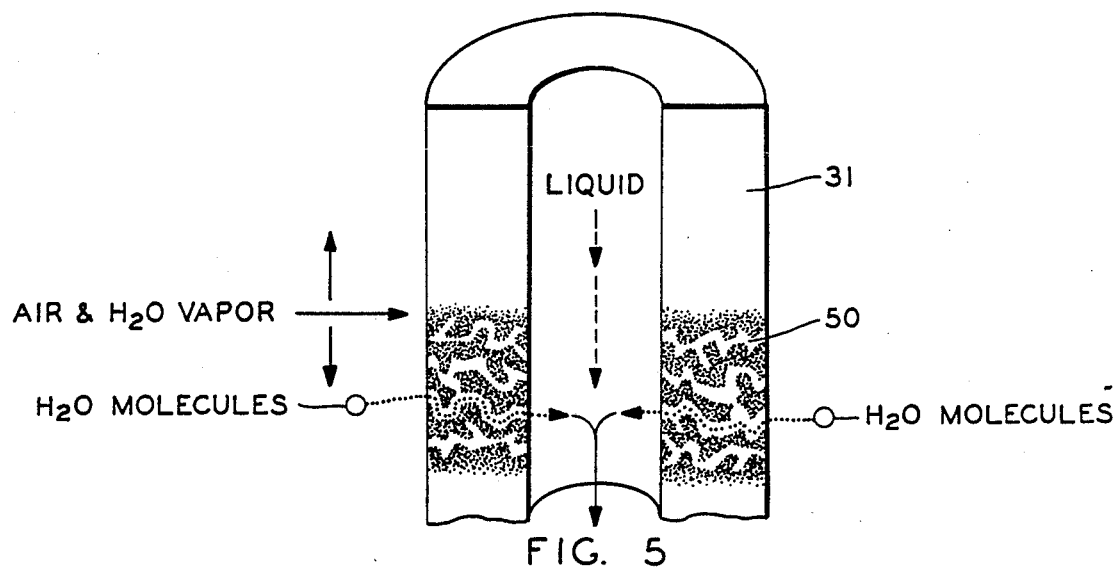

The sorption of water through the hollow fibers utilizing TEG or other collecting liquid wherein the collecting liquid does not wet the pores and is illustrated in the magnified fragmentary view of FIG. 5. The results of dehumidification utilizing this process are further illustrated in FIG. 8. For that system, a membrane module made of polypropylene hollow fibers was used. The moisture absorbing liquid TEG did not wet the polypropylene membrane pores and was circulated inside the hollow fibers. FIG. 8 reveals that humidity of air in the upstream side was reduced from 95% to, initially, under 15% as the air was flowed through the membrane module. With respect to the data taken in FIG. 5, it is noteworthy that the absorbed water in the TEG was not removed but simply recirculated by the use of a pump. This is shown in the schematic diagram of FIG. 8A wherein the TEG collecting liquid is circulated by pump 72 and the ambient air, inlet 70 and outlet 71. This resulted in the slow increase of the relative humidity of the dry air as the concentration of water vapor in the TEG increased. In a commercial system water vapors in the air continually sorbed by TEG would be removed by regeneration of the TEG as by heating in the presence of air bubbling such as shown in FIG. 1 so that the water vapor is removed continually by the air bubbles exhausted from the oil reservoir.

EXAMPLE 3

Figure 6:
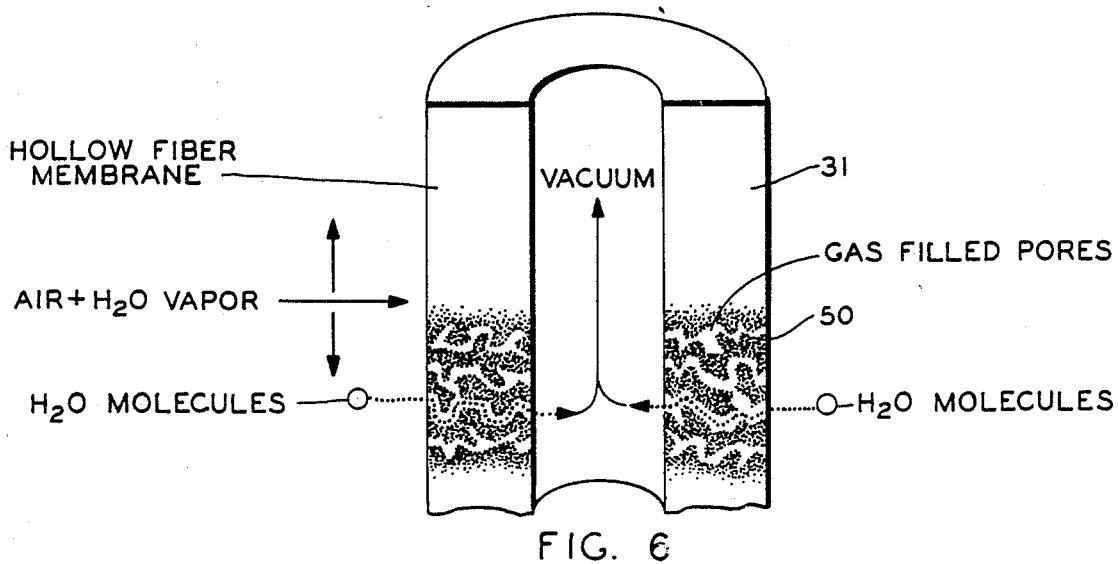
Figure 9:
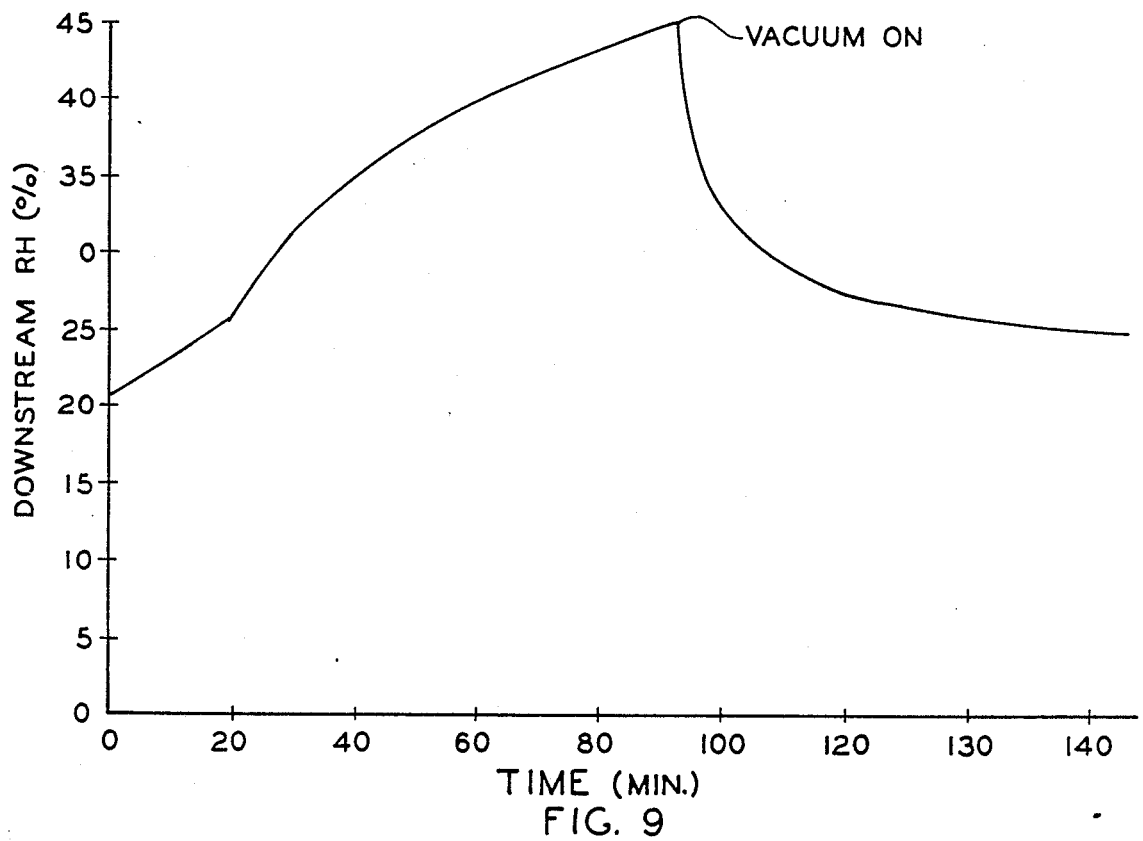
FIGS. 9 and 9A respectively represent a time plot of the relative humidity (RH) of downstream air and a system schematic with respect to the technique of FIG. 6.
Figure 9A:
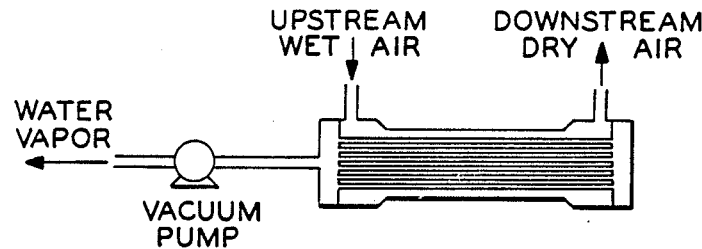

In yet another embodiment, that of Example 3, no sorption medium is used at all. FIGS. 6, 9 and 9A address this technique. This embodiment makes use of the Kelvin or "super" Kelvin effect described in detail in the above-referenced U.S. Pat. No. 4,710,205, issued Dec. 1, 1987. The feasibility of water vapor removal from here utilizing the system wherein no sorption medium is provided has been demonstrated successfully for fibers or membrane material of sufficiently small pore size. In this situation the vapor pressure of the liquid in the pores is reduced below the partial pressure of the same species, e.g., water vapor, in the ambient air. If the pores are sufficiently small, i.e., $\leq$ approximately 0.02 microns, preferably less than 0.005, water will continually condense of its own accord in the micro pores 50 and as it is removed by the vacuum internal to the fiber, will continually replenish itself in the pores. In this manner, in effect, water vapor is caused to migrate through the membrane without the need of any collecting liquid. The system holds the vacuum quite well. The data is shown in FIG. 9 and the experimental system illustrated schematically in FIG. 9A. It is substantially identical to that of FIG. 7A including the fiber bundle employed being as described for the embodiment first above except that no collection medium was employed in the pores.

The data shown in FIG. 9 indicates the relative humidity of downstream air as a function of time after the humid air (RH=100%) was passed through the membrane module. The behavior appears similar to that found in FIG. 7, in that it is seen that the relative humidity of the upstream air is reduced from 100% to approximately 21% initially in the downstream air; however, the relative humidity in the downstream air increased slowly with time until the vacuum was applied. Thereafter, the humidity in the downstream air was maintained steadily at 25% by vacuum.

In the case of the technique of FIGS. 6, 9 and 9A, further data relative to flux (water vapor removal), vs. air flow is shown in Table I, next below.

TABLE I

FLUX (WATER REMOVAL) VS. AIR FLOW

|  | $V_{air}$ f/m | Humidity % Up | Humidity % Down | Flux g/m cm$^2$ | Removal Rate g/m |
|---|---|---|---|---|---|
| System* | 2.90 | 98 | 22 | 5.88 × 10$^{-7}$ | |
|  | 5.80 | 95 | 24 | 10.98 | |
|  | 8.65 | 90 | 26 | 14.76 | |
|  | 40.63 | 76 | 55 | 22.74 | 0.03 |
|  | 175.0 | 76 | 57 | 88.8 | 0.13 |
| Scale Model+ (Parallel Flow) | ++500 |  |  | 88.8 | 3.9 |
| Scale Model (Cross Flow) | 500 |  |  | $\geq$888 | $\geq$39 |

*Module 8 in. long, 2 in. OD; A = 13,900 cm$^2$, 10800 fibers, 0.003 Avg. pore size. (Actual data)
+ Scale Model: 1 ft × 1 ft × 1 ft, 10% packing density A = 435,000 cm$^2$; 175,000 fibers
++ Numbers for scale models are theoretical calculations.

It should be noted that the experiments were carried on utilizing the basic "shell-and-tube" type system so that more precise measurements could readily be made with respect to upstream and downstream humidity and other parameters closely controlled. Other configurations including different types of transfer configurations would occur to those skilled in the art.

Table I demonstrates the feasibility of larger fiber sorbtion modules. It is quite possible for large megafiber systems to be used to control the humidity in rather large conditioned spaces using continuous vacuum exhaust, regeneration of the collecting by heating the liquid, or by using a sweep gas to remove excess water vapor from the collecting liquid.

What is claimed is:
1. A system for removing water vapor from the ambient atmosphere of a conditioned space comprising:
   a transfer medium further comprising a bundle of microporous organic hollow fibers disposed in parallel spaced relation, each fiber being further characterized by a radial microporous matrix structure and a hollow central axial capillary interior;
   and means for providing a concentration gradient across the transfer medium sufficient to cause continuous sorption of water on one surface and continuous removal of water from the opposite surface including, a hygroscopic collecting liquid stabilized in the pores of the microporous matrix, said liquid characterized by transport properties favoring the attraction and migration of water vapor molecules and having the ability to wet the material of the pores;

means for establishing a low partial pressure of water vapor in the hollow interior of said fibers such that when the outer surfaces of said fibers are exposed to the ambient atmosphere water vapor molecules are transported through the pores via the collection liquid; and means for removing said water vapor from the hollow interior of said fibers.

2. The system of claim 1 wherein said hygroscopic collection liquid is selected from the group consisting of polar alcohols, glycols, glycerols and solutions consisting of a solvent and solute and the hollow porous fibers are cellulose.

3. The system of claim 1 wherein said hygroscopic collection liquid is selected from polyethylene glycol and triethylene glycol and the hollow porous fibers are cellulose.

4. A system for removing water vapor from the ambient atmosphere of a conditioned space comprising:

a transfer medium further comprising a bundle of organic microporous hollow fibers disposed in parallel spaced relation, each such fiber being further characterized by a radial microporous matrix structure and a hollow central axial capillary interior;

and means for providing a concentration gradient across the transfer medium sufficient to cause continuous sorption of water on one surface and continuous removal of water from the opposite surface including, a hygroscopic collecting liquid stabilized in the pores of the microporous matrix, said liquid characterized by transport properties favoring the attraction and migration of water vapor molecules and having the ability to wet the material of the pores.

means for establishing a vacuum in the hollow interior of said fibers such that when the outer surfaces of said fibers are exposed to the ambient atmosphere water vapor molecules are transported through the pores via the collection liquid and removed from the collection liquid in the interior of said fibers by the vacuum.

5. The system of claim 4 wherein said hygroscopic collection liquid is selected from the group consisting of polar alcohols, glycols, glycerols and solutions consisting of a solvent and solute and the hollow porous fibers are cellulose.

6. A method of removing water from ambient atmosphere comprising the steps of:

exposing the ambient atmosphere to the outside surfaces of a bundle of hollow porous organic fibers each characterized by a radial porous matrix structure and a hollow central axial capillary core; providing a concentration gradient across the transfer medium sufficient to cause continuous sorption of water on one surface of the fibers and continuous surface of said fibers by further providing a hygroscopic transport liquid stabilized in the pores of such fibers, said liquid characterized by attraction and transport properties favoring the migration of water vapor molecules and having the ability to wet the material of said pores; and exposing the inside surface of said plurality of hollow porous fibers to a medium having a low partial pressure of water vapor to remove migrating water vapor molecules to effluent.

7. The method of claim 6 wherein said low partial pressure of water vapor at the inner surfaces of said hollow porous fibers is achieved by exposing said inner surfaces to a vacuum.

* * * * *